United States Patent [19]
Feitelson et al.

[11] Patent Number: 5,479,598
[45] Date of Patent: Dec. 26, 1995

[54] COMPACT GRAPHICAL PARALLEL PROGRAM USER OUTPUT INTERFACE CONTROLLED DIRECTLY BY THE PARALLEL COMPUTER PROGRAM

[75] Inventors: Dror G. Feitelson, Bronx; Blake G. Fitch, New Rochelle; Mark E. Giampapa, Irvington, all of N.Y.

[73] Assignee: International Business Machines Corporation, Armonk, N.Y.

[21] Appl. No.: 965,591

[22] Filed: Oct. 23, 1992

[51] Int. Cl.[6] .................................................. G06F 3/14
[52] U.S. Cl. ......................... 395/155; 395/157; 395/161
[58] Field of Search ................................. 395/155, 161, 395/153, 158

[56] References Cited

U.S. PATENT DOCUMENTS

| | | | |
|---|---|---|---|
| 5,289,567 | 2/1994 | Roth | 395/155 X |
| 5,289,568 | 2/1994 | Hosoya et al. | 395/155 X |
| 5,333,207 | 7/1994 | Rutenberg | 395/155 X |

*Primary Examiner*—Heather R. Herndon
*Assistant Examiner*—Cliff Nguyen Vo
*Attorney, Agent, or Firm*—Ronald L. Drumheller

[57] ABSTRACT

An output window is created on the user's terminal screen when a parallel program is executing. This window displays an array of graphical elements (each preferably a small square area), which are partitioned into groups of one or more graphical elements per group, each partition representing a task or thread of the parallel program. These graphical elements are capable of assuming any one of several (or many) different graphical states (each of these states preferably being a different color for the graphical clement). A task running on a parallel processor system can set its associated graphical elements to different states (e.g., colors) during execution of the task generally through a special instruction in the task that specifics which graphical clement (of the graphical elements assigned to that task) should be set and to what state. When such an instruction is executed by a processor running that task, a message is sent to the module that controls the graphical element display at the user's terminal. The message identifies the task issuing the message, the particular graphical element affected among the graphical elements assigned to that task and the particular state for that graphical element.

23 Claims, 9 Drawing Sheets

COMPACT GRAPHICAL PARALLEL PROGRAM USER OUTPUT INTERFACE CONTROLLED DIRECTLY BY THE PARALLEL COMPUTER PROGRAM

FIELD OF THE INVENTION

This invention generally relates to parallel processing and more specifically to the output interface to a user which is available to a parallel program, especially when the parallel program is of the massively parallel type.

BACKGROUND OF THE INVENTION

Massively parallel multiprocessors are computers with hundreds or even thousands of processors. One of the main problems in using such machines is how to implement interactions between a running program and a user, and specifically, how to implement terminal output to a user. Output can be a problem because the user might be flooded by independent output streams from all the processors, which might number in the hundreds or even thousands of processors. Regrettably, humans by nature can only concentrate on one data stream at a time.

Figure 1:
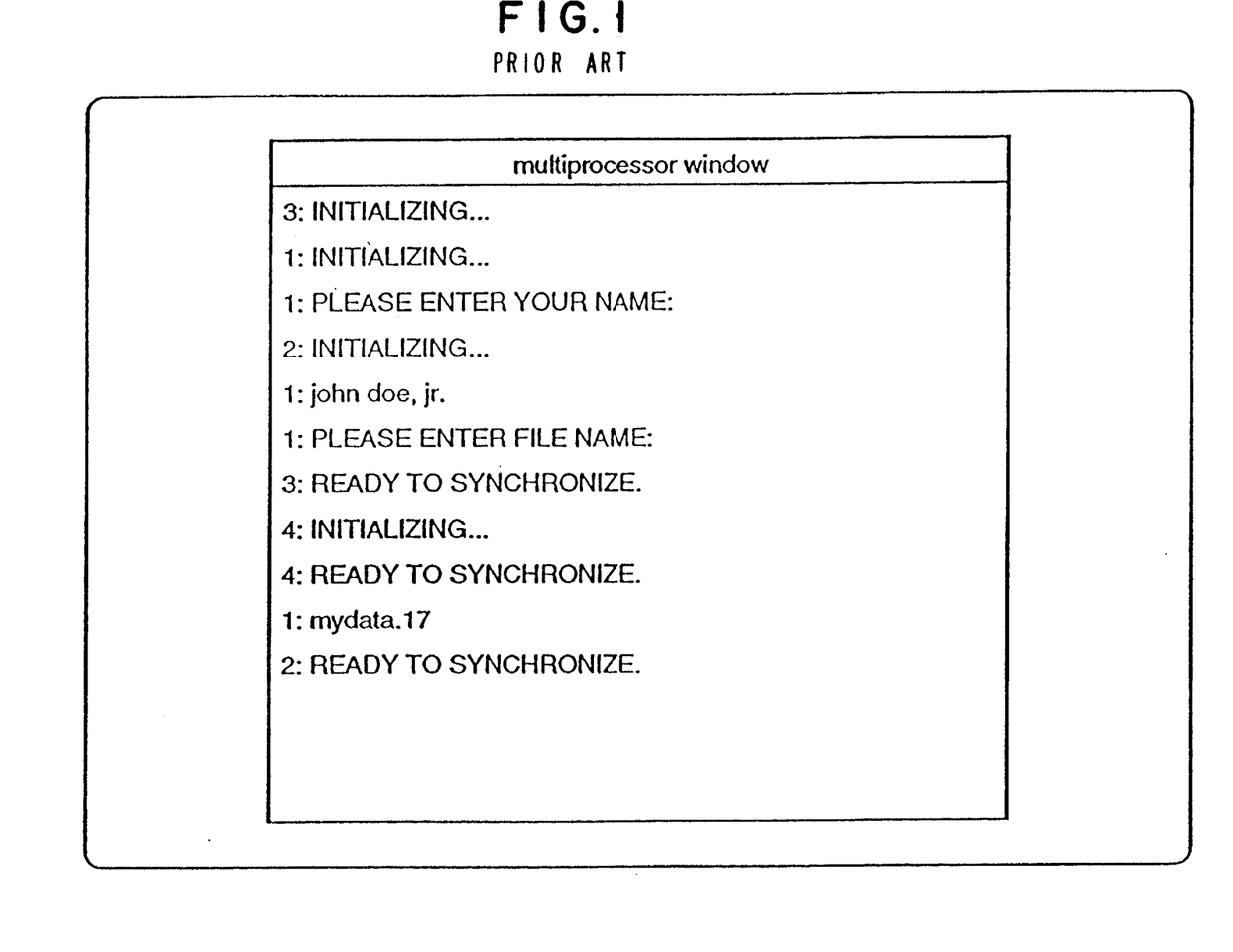
FIG. 1 illustrates a prior art I/O display in which the text I/O with respect to multiple processors is interleaved.

Most parallel systems do not provide any special support for terminal output from a parallel program. Hence when many processors generate output, these output streams are interleaved by the system and presented to the user as one stream. If this is the case, the programmer must add processor identification tags to the outputs, and then the user must sift through the output to search for those parts that were generated by a particular processor. FIG. 1 illustrates such a conventional interleaved output stream with output in uppercase and input in lowercase. This situation is unsatisfactory because terminal output is very important in the programming and debugging phases of new applications. When an application malfunctions, programmers face the problem of finding out exactly what went wrong. As debuggers for parallel systems are not always available, many programmers insert output instructions into the program. The output is then used to try and create a mental picture of what the program is doing, and track down the bug.

In the Express system sold by ParaSoft Corp., the terminal output problem is reduced to some extent by limiting the semantics of terminal output so as to reduce the number of possible output patterns. For example, terminal output can be done in either "single" mode or in "multi" mode. Single mode means that all the processors must output exactly the same text. This is checked by the system, and then only one copy of the output is displayed to the user. Multi mode means that each processor buffers its output internally, until they all agree to "flush". The outputs from the different processors are then displayed to the user one after the other, according to the numerical order of the processors. A major drawback of this approach is that it limits the patterns of terminal output, and more specifically that it requires that the processors always synchronize in order to perform terminal output.

An alternative approach is described by J. E. Lumpp et al. in "CAPS: A Coding Aid for PASM," Comm. ACM, Vol. 34 No. 11, pp. 104–117 (Nov. 1991), where separate windows are provided to all processors in a partition. While this decouples the output operations of different processors, it does not scale up well for a large number of processors in a partition. If the number of processors is large (say a hundred processors in a partition), it is clearly very awkward to manage the display screen (having a hundred windows). The situation becomes unmanageable for a massively parallel partition that might contain thousands and even potentially tens of thousands of processors.

While text is the most natural and direct form of output, it has often been noted that human beings assimilate graphical information better than text. That is why various programming and instrumentation tools use graphics to present the user or programmer with information about the behavior of a parallel program. For example, the instrumentation facility described by R. R. Glenn and D. V. Pryor in "Instrumentation for a Massively Parallel MIMD Application," J. Parallel Distributed Comput., Vol. 12 No. 3, pp. 223–236 (July 1991) uses a 3-D array of colored dots to represent network congestion in a multiprocessor composed of processors connected in a 3-D) mesh. However, this cannot be considered output from the program itself.

The program visualization environment described by D. N. Kimmelman and T. A. Ngo in "The RP3 Program Visualization Environment," IBM J. Res. Dev., Vol. 35, No. 5/6, pp. 635–651 (Sept/Nov 1991) is much more versatile. It collects events from the hardware, system software and application at runtime, and displays them in a variety of ways: bar charts, x-y graphs, arrays of colored lights, and other specially designed formats. As events may be generated directly by the application, this can be viewed as a form of output. However, there is a strong separation between the generation of events on the one hand, and the display on the other hand. Events are simply tuples that include a processor ID, a timestamp, and a data value. The display is totally controlled by the user who is running the program, including the decision as to which format to use to display each type of events (including the option of not displaying them at all). Thus the program actually has no control over the appearance of its output. In addition, this system is very difficult to use if the sole objective is just to provide a means for output from a parallel program; users need to learn how to use the system and how to set up the displays, and cannot simply expect the system to create a "reasonable" display by itself.

Parallel programs have used graphical output directly in scientific computing. For example, the Express system supports graphic primitives that allow multiple processors to cooperate in the generation of a single image (see for example "Express C Reference Guide" 1990). This is a very flexible medium, which allows the programmer full freedom of expression; however, it also forces the programmer to take care of all the little details and make many design choices. Therefore graphical output is relatively hard to use in all of these prior systems, and consequently, it is usually not considered a viable alternative to text output at the program development stage.

SUMMARY OF THE INVENTION

It is an object of this invention to provide application programs running on massively parallel multiprocessors with a simple-to-use graphical output mechanism that may replace text output.

Another object is to allow the application programs direct control over the appearance of this output in terms of graphical symbols.

These and further objects and features are achieved in accordance with this invention by creating an output window on the user's terminal screen when a parallel program is executing. This window displays an array of graphical elements. The graphical elements are partitioned into groups of one or more graphical elements per group. Each partition of graphical elements represents a task (or thread depending upon the definition of task and/or thread) of the parallel program. If only one task (or thread) is running on each processor, then each partition of graphical elements will also represent one processor.

These graphical elements are capable of assuming any one of several (or many) different graphical states. Preferably each of these graphical elements is a small geometrically shaped area on the user's screen (preferably a square) and the different graphical states are each represented by a different color for the graphical element. An array such as this looks to the user like an array of color-coded LEDs, so we have called these graphical elements VLEDs (for virtual LEDs) in the description of a preferred embodiment).

In each such partition there is optionally and preferably one graphical element which represents the text I/O status of the task or thread represented by that partition of the array of graphical elements. We have called these special function graphical elements I/O status indicators and have described and claimed this feature more particularly in a separate patent application filed on the same day as this patent application and entitled "GRAPHICAL USER INTERFACE FOR MANAGING TEXT I/O BETWEEN A USER AND A PARALLEL PROGRAM".

A task running on a parallel processor system can set its associated VLEDs to different colors during execution of the task (except for VLEDs which are used as I/O status indicators) through a special instruction in the task that specifies which VLED (of the VLEDs assigned to that task) should be set and to what color. When such an instruction is executed by a processor running that task, a message is sent to the module that controls the VLED display at the user's terminal (that module being herein generally called a graphical element display manager or an I/O manager if it also controls I/O status indicator VLEDs). The message identifies the task issuing the message, the particular VLED affected among the VLEDs assigned to that task and the particular color for that VLED. Another special instruction when executed in a task will cause a message to be sent to the graphical element display manager from the task to increase or decrease the number of displayed graphical elements for each of the tasks to a specified number of graphical elements. There is also a special instruction for a task to request from the graphical element display manager how many VLEDs are being displayed at the present time for each task.

This invention particularly improves upon prior systems in that the parallel program itself directly controls a graphical display with a simple instruction without making the user learn to use and then define and implement a graphical display generated from data produced by a running parallel program. This puts the generation of the graphical display directly in the hands of the programmer of the parallel program rather than the user of the parallel program. Another improvement over prior systems stems from the provision of a runtime library function which is used by a task to generate a message that directly controls the graphical display. By providing such a runtime library function, the programmer of the parallel program task also does not need to become familiar with the details of defining and creating a graphical display. A VLED instruction is implemented directly by the runtime library without requiring that the programmer even be familiar with how the intended graphical result has been accomplished by the runtime library and graphical element display manager.

Another improvement over prior systems is that a VLED display can be used to provide information to a user from a very large number of individual tasks or processors or threads. On a high resolution display available today as many as 100,000 or more VLEDs could be displayed and patterns easily comprehended by a user, making a VLED display usable with a massively parallel program in a flexible and convenient way.

BRIEF DESCRIPTION OF THE DRAWINGS

The invention will now be described in more detail with reference to drawings in which.

DETAILED DESCRIPTION

The present invention is preferably implemented with software programs running on a hardware computer system platform. A suitable hardware platform will be described first as well as suitable system software needed to implement this invention. Since most manufacturers of workstations offer an X windowing environment for their workstation platform, an X windowing environment is used as the base for a preferred embodiment of this invention. Next, the operation of an illustrative example of this invention will be described in detail in order to describe various features. Finally, a more detailed description of a preferred implementation of this example with software will is described.

Hardware And Software Platform

Figure 2:
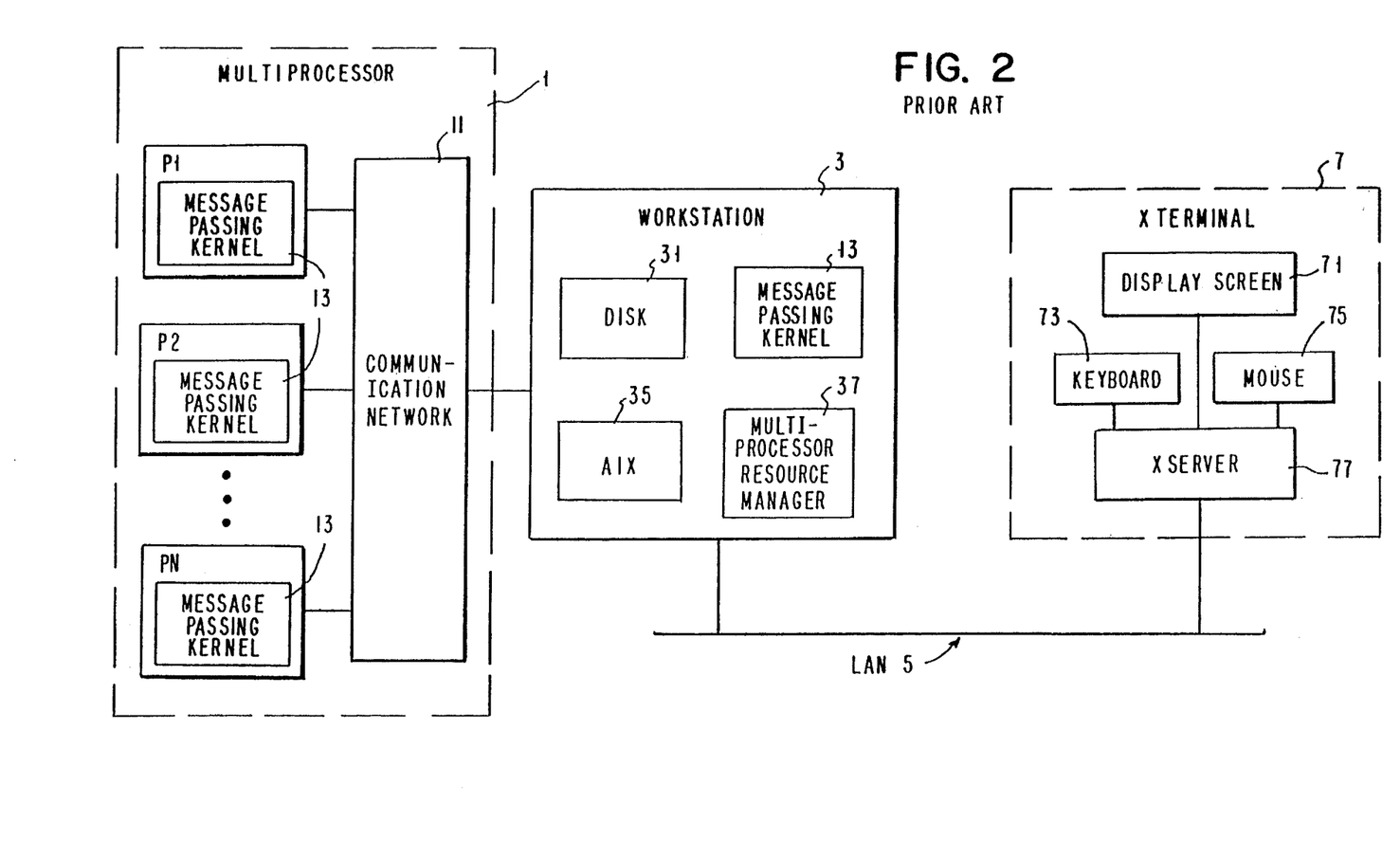
FIG. 2 is a block diagram of a prior art platform on which the present invention may be implemented.

A hardware platform and basic system software suitable for implementing this invention are shown in FIG. 2. A multiprocessor 1 is composed of N processors P1, P2 ... PN connected by a communication network 11. Each processor has some local memory, and there may be global memory as well. Prior to loading user programs, the only software on these processors is a message-passing kernel 13. This provides message passing services for application programs.

A workstation 3 is also connected to the multiprocessor's communication network. To be able to communicate with the multiprocessor's processors, it also has a copy of the message-passing kernel 13. Alternatively, the workstation could be connected to a local area network (LAN) which is connected to the multiprocessor's network. In this case, the communication protocol between the workstation and the multiprocessor's processors would be more complicated. The workstation has a disk 31 that is used to store object files of parallel programs, and other files. Alternatively, the workstation could be diskless, and be connected to a file server via a LAN. The workstation runs some suitable operating system such as AIX (an IBM product). One of the processes running on the workstation is the multiprocessor resource manager 37, which takes care of the allocation of processors to parallel programs. Alternatively, the resource manager could run on the multiprocessor itself or on another workstation, connected to this one by a LAN.

The workstation is connected by a LAN 5 to an X terminal 7. Alternatively, the workstation console could be used as a display terminal for the user. The X terminal provides an X windows system graphical environment for the user interface. Alternatively, another windowing system could be used. The X terminal includes a display screen 71, a keyboard 73, and a mouse 75. The only software running on the X terminal is an X server 77. It communicates with X clients running on the workstation 3 over the LAN 5 using the X protocol.

A short description of the X system will be given now in order to introduce terminology that will be used below. Programs that use the X windows user interface are called X clients. These are normal application programs that are linked with the X runtime library and call functions from this library to create and use the desired graphical interface. For example, there are functions to create a window, to resize a window, to draw on a window, to write to a window, and to close a window. The functions communicate with the X server to produce the desired effect.

Input from the user to the program is handled by callbacks. Callbacks are functions in the application program, not the X library. During the startup phase, the application attaches callbacks to various X events. Events are actually user actions; for example, if the user types text into a window, presses a mouse button, or causes a window to be exposed, these are events. After startup, the client application typically enters the main loop. In this loop, it continually calls an X library function that asks the X server if any new events have occurred. If an event had occurred, it is executed, which typically means that the attached callback function is called. For example, if the user presses a mouse button, the X server sends this event to the X library. The next time that the application does the main loop and asks for new levels, this event will be executed. In effect, this will call the application callback function that was designated for handling of "button pressed" events. This function does whatever the application should do in response to the button being pressed. This could involve sending additional instructions to the X server, e.g. to open another window.

Startup For Parallel Program Execution

Figure 3:
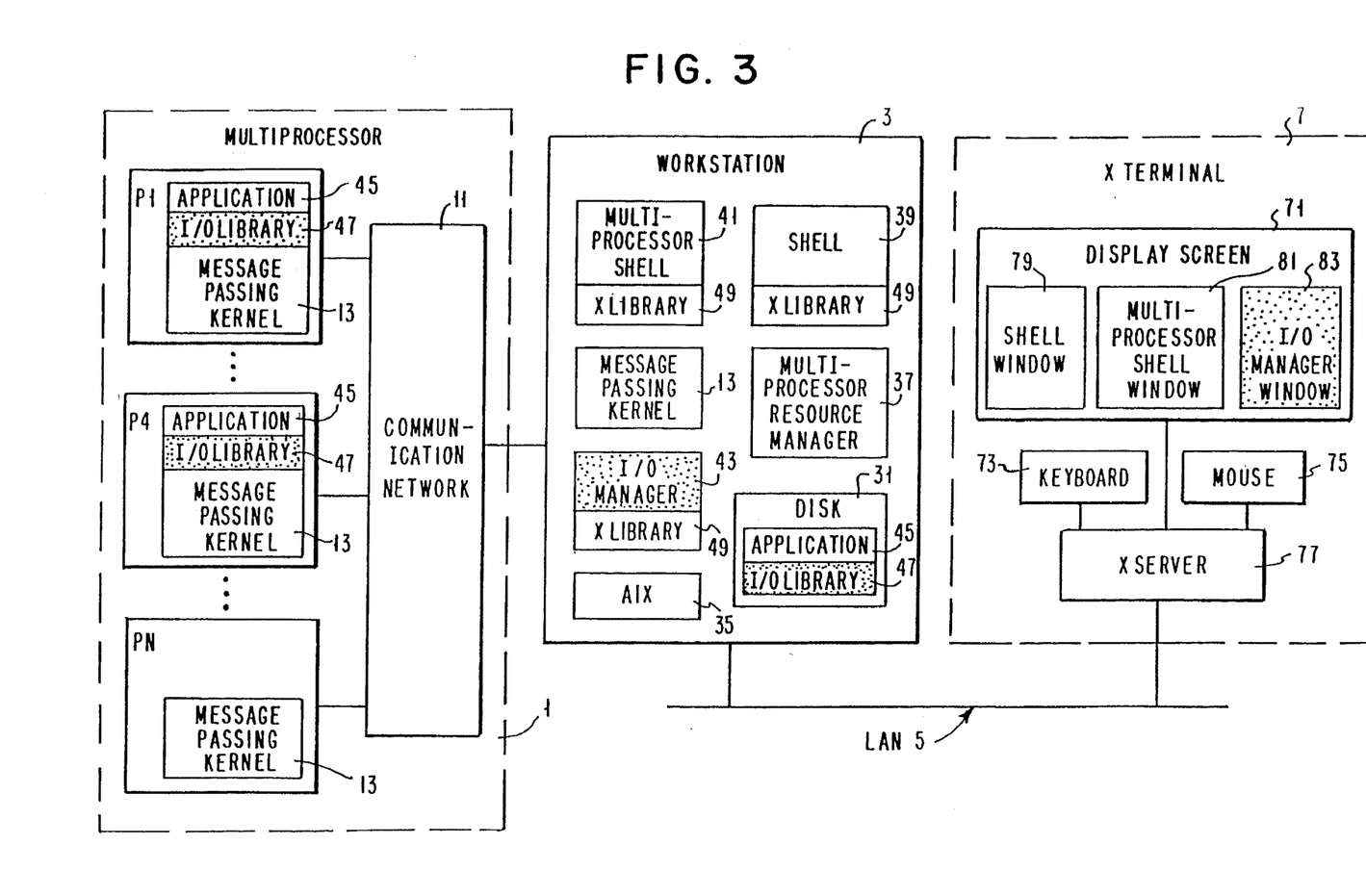
FIG. 3 is a block diagram of the FIG. 2 platform with the parts added in accordance with this invention being shaded.

Referring now to FIG. 3, initially the user is logged on to the workstation 3 from the X terminal 7. This means that a shell X client 39 linked with the X library 49 is running on the workstation ready to accept commands entered through its window 79 on the X terminal display 71. The user types the command to start a session with the multiprocessor in this window. This action invokes a callback in tire shell, which interprets the command. It then executes the command, and creates a new X client that will serve as the multiprocessor shell 41. Naturally, this too is linked with the X library 49. The multiprocessor shell calls one X library function to create a connection with the X server, and then calls another function to create a new window for itself. This request is sent to the X server, which creates the window 81.

When the multiprocessor shell window 81 appears, the user uses the mouse 75 to shift focus to that window. Then the user types in the command requesting a partition of the multiprocessor. This action invokes a callback in the multiprocessor shell 41, which interprets the command. For concreteness of the example, we assume that a partition of four processors has been requested. The multiprocessor shell then interacts with the multiprocessor resource manager 37 to acquire the requested number of processors on behalf of the user. Alternatively, processors could be shared among a number of users at a time, rather than each user having a dedicated partition.

Up to this point, the described system is a conventional X system, but now the user starts up a graphical element display, which is a new component in this X system and is used to implement the described embodiment of this invention. The graphical element display manager and any other new parts added by this invention to a conventional X system have been shaded for clarity. Since the graphical element display manager optionally but preferably also handles a further function relating to I/O status (and uses I/O status indicators for this purpose), the graphical element display manager has been called an I/O manager herein. To start up the I/O manager, another command is typed into the multiprocessor shell window 81. Again, this action invokes a callback in the multiprocessor shell 41, which interprets the command. Consequently, the multiprocessor shell creates a new X client that will serve as the 1/0 manager 43. Naturally, this too is linked with the X library 49. Alternatively, the I/O manager could be started up automatically by the multiprocessor shell, without waiting for a special command to this effect. The I/O manager calls the X library function to create a connection with the X server, and then the function to create a new window for itself. This request is sent to the X server, which creates an I/O manager window 83. This window is also referred to below as the VLED display.

Finally, it is time to load and execute a parallel program. To do so, the user types the "load" command and the name of the program's object file in the multiprocessor shell window 81. As before, this action invokes a callback in the multiprocessor shell 41, which interprets the command. The multiprocessor shell first finds the program 45 in the workstation's disk 31 (or, alternatively, requests it from a file server over a LAN). Note that this is the object file, after the program had been compiled and linked. Among other things, this included linking with an I/O runtime library 47 that is used to interact with the I/O manager 43, as described below. The multiprocessor shell then uses the message passing kernel 13 to download the program onto the multiprocessor's processors, and create a copy in each one. Again, this includes both the program 45 itself and the I/O runtime library 47. Note that the program is only loaded on the processors in the user's partition.

Once loaded, the program starts execution. A detailed example of how it interacts with the I/O manager will be described next.

DETAILED DESCRIPTION OF THE OPERATION

Figure 4:
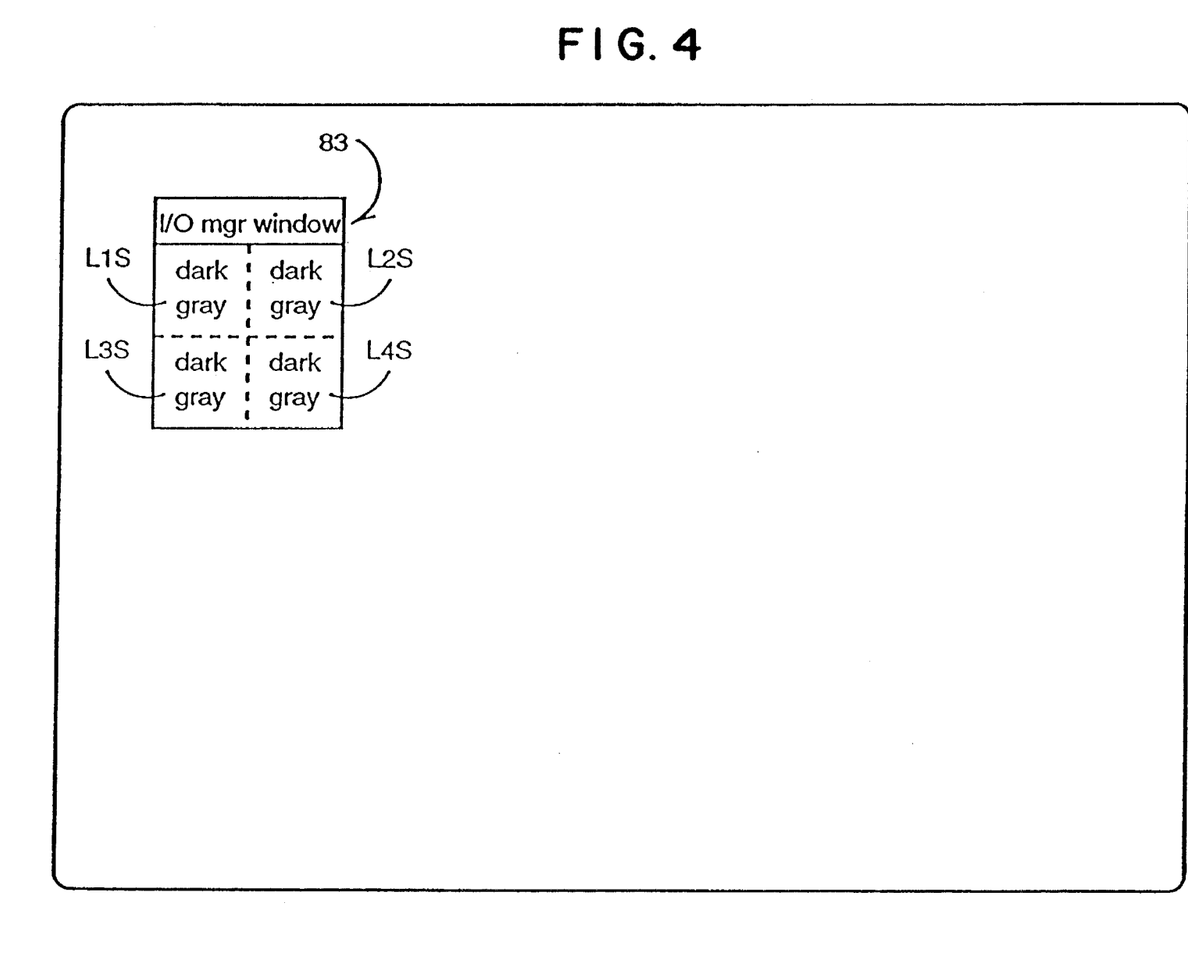
FIG. 4 is an illustrative view of a user display screen having an I/O window that contains I/O status indicators.

In the described example, when the I/O manager's window appears, it looks like element 83 in FIG. 4 (in FIGS. 4–8, the shell windows are not shown for clarity). The illustrated I/O manager's window contains 4 graphical elements.

In this implementation the graphical elements are colored geometrical areas (shown as squares) dividing up the main area of the window. We have generally named these graphical elements VLEDs (for virtual LEDs) because they look like colored light emitting diodes to a user. As will become more apparent as this description proceeds there may be VLEDs in this window which serve separate functions. For sake of clarity, FIG. 4 only illustrates VLEDs that serve the principal function of this invention, which is I/O status indication. VLEDs which serve this principal function are also called I/O status indicators in this description. Each I/O status indicator in this example represents one of the four processors in the user's partition (or more specifically the one task or thread running on that processor), since it is assumed that each processor has only one task or thread running on it. The VLEDs are identified as L1S, L2S, L3S, and L4S. They are colored dark gray, which signifies in this example that they represent tasks (or processors) but that the represented tasks are not running yet.

Figure 5:
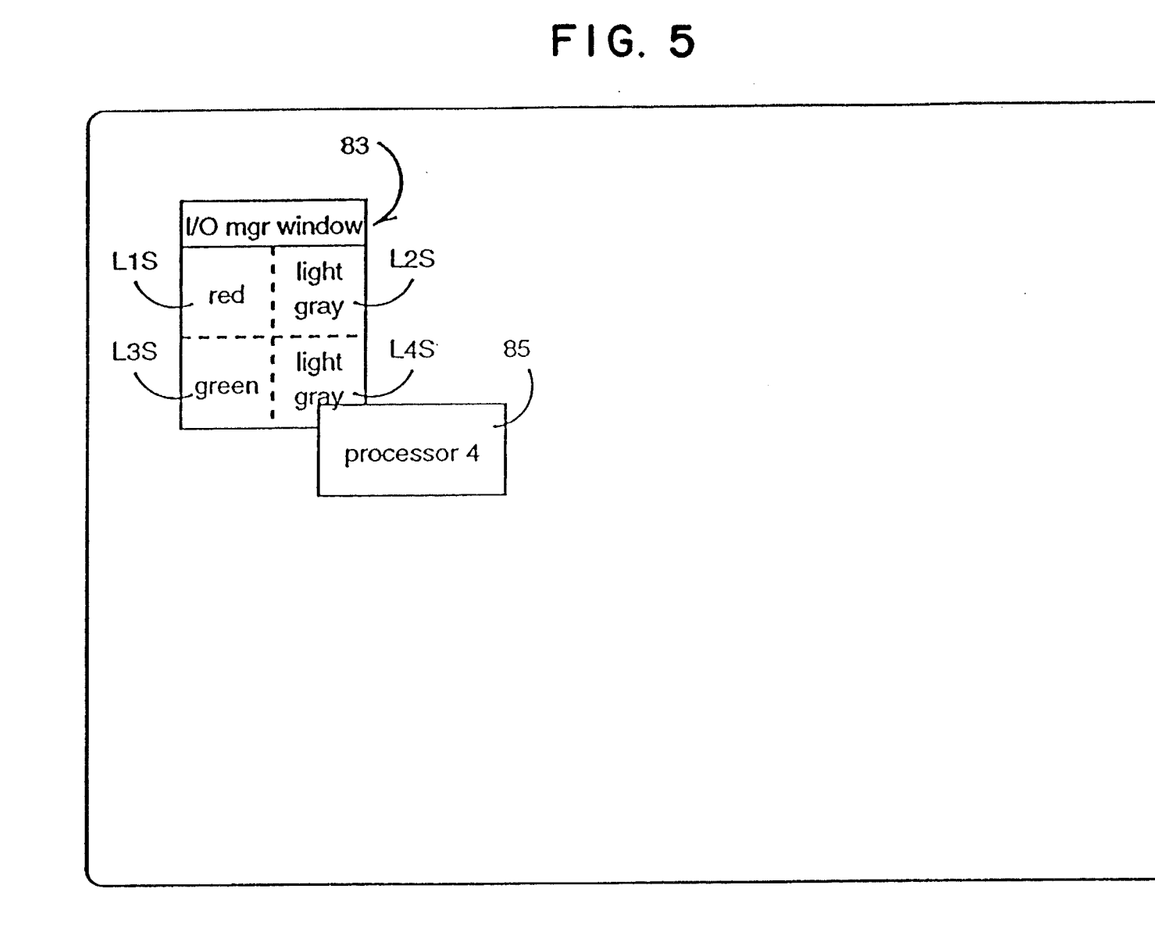
FIG. 5 is an illustrative view of the FIG. 4 user display screen at a particular stage of use.

When the program is loaded, the multiprocessor shell notifies the I/O manager. The I/O manager then changes the color of the I/O status indicators which correspond to running tasks to light gray. This is the graphical state shown for L2S and L4S in FIG. 5. Except for changes of color between "not running" and "running", thereafter the graphical state of the I/O status indicators changes only if the running program performs some text I/O operation. For example, assume that the program 45 running on processor number 3 performs an output operation. To do so, it calls the "output string" function in the I/O runtime library 47. This function uses the message passing kernel 13 to communicate with the I/O manager 43. The I/0 manager cannot display the output, because it does not have a window for that purpose yet. Instead, it stores the output internally, and colors the I/O status indicator associated with the outputting processor green. In the example of FIG. 5, processor number 3 did some output, so I/O status Indicator L3S is green. Likewise, when a processor performs an input operation, it calls the "input string" function. This sends a message to the I/O manager asking for input to this processor. If no prior input is available, the I/O manager colors the corresponding I/O status indicator red. In the example of FIG. 5, processor number 1 has asked for input, so I/O status indicator L1S is currently red. Note that it is possible that processor 1 first performed an output operation to prompt the user for input, turning L1S green, and only then performed the input operation, turning L1S red. The I/O status indicators do not maintain history, they just show the current I/O status.

In case the user is confused by the different colors of the different VLEDs, and wants to know which processor any particular one represents, the mouse is used to point at a certain I/O status indicator (or even to any other VLED assigned to represent the same task), and then the designated mouse button is pressed. This action causes a callback in the I/O manager. The callback function creates a temporary popup window that identifies the processor associated with the pointed VLED. FIG. 5 shows the screen when the user asks to identify I/0 status indicator L4S. The popup window 85 says that it represents processor number 4.

In order to actually read the output or type some input, the user must open a text window to the processor. To do so, the mouse is used to point at the I/O status indicator representing the task (or processor) in question, and the designated mouse button is pressed. This causes another callback to be invoked in the I/O manager. This callback requests the X server for a new window. If there is any text stored internally for this processor, from previous output and/or input activity, it is displayed in the window. At the same time, the I/O status indicator representing the task (or processor) is colored white to signify that this processor now has an open window for I/O.

Figure 6:
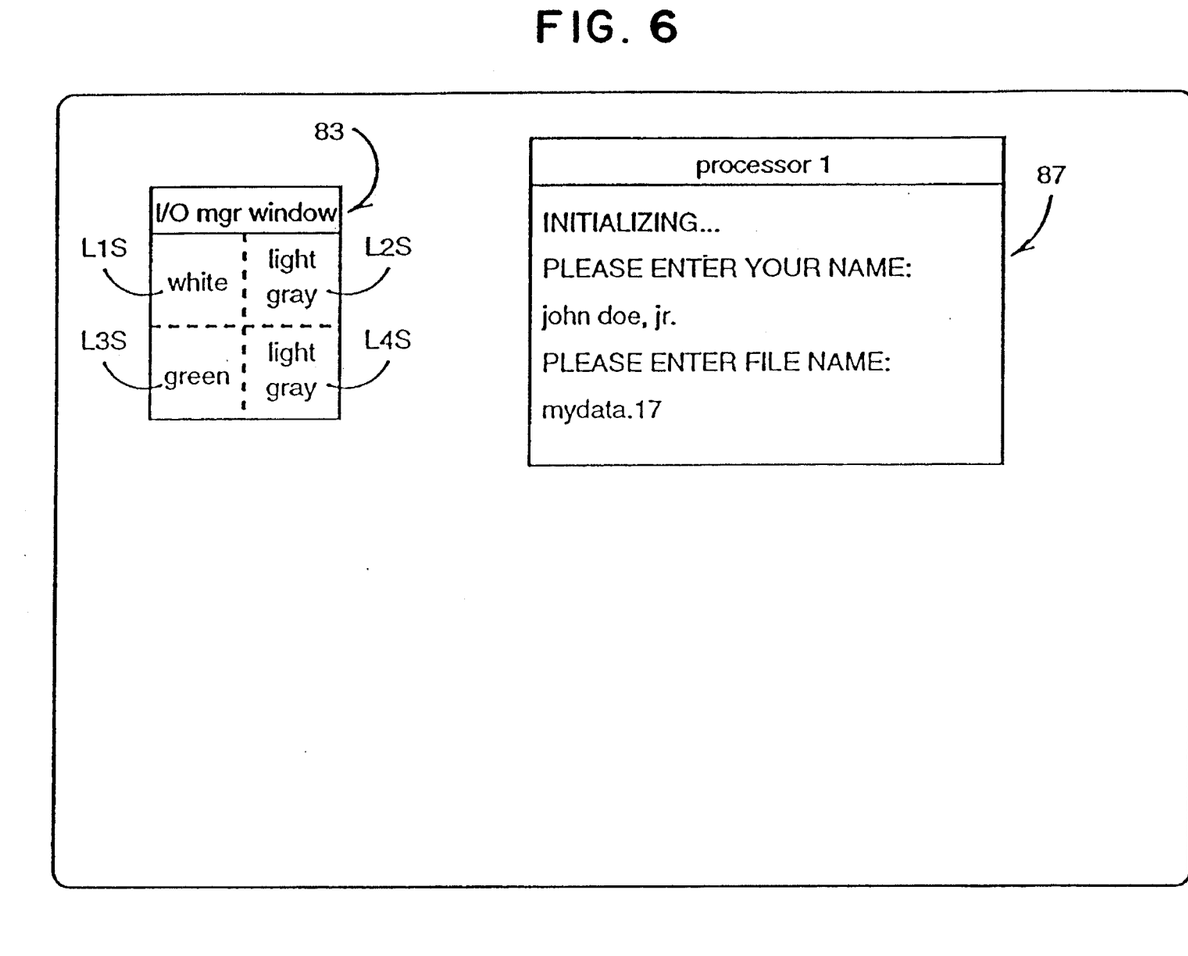
FIG. 6 is an illustrative view of the FIG. 4 user display screen at another stage of use in which an I/O window has been opened.

FIG. 6 shows the screen when an I/O window 87 is opened to processor number 1. Continuing with the above example, processor number 1 had done some output and then requested input. Thus when the window is opened the, first line (the output) appears in it. The user then uses the mouse to shift focus to this window, and types in some input. When the user hits the return key, a callback is invoked in the I/O manager. This callback issues an X function call to retrieve the text from the window. As processor 1 had already requested input, the input text is sent to it using the message passing kernel. Assume processor 1 now outputs another line of text. When this reaches the I/O manager, it is displayed immediately, because there exists an open window for this processor. The I/O status indicator representing processor 1 does not change color in this case.

Figure 7:
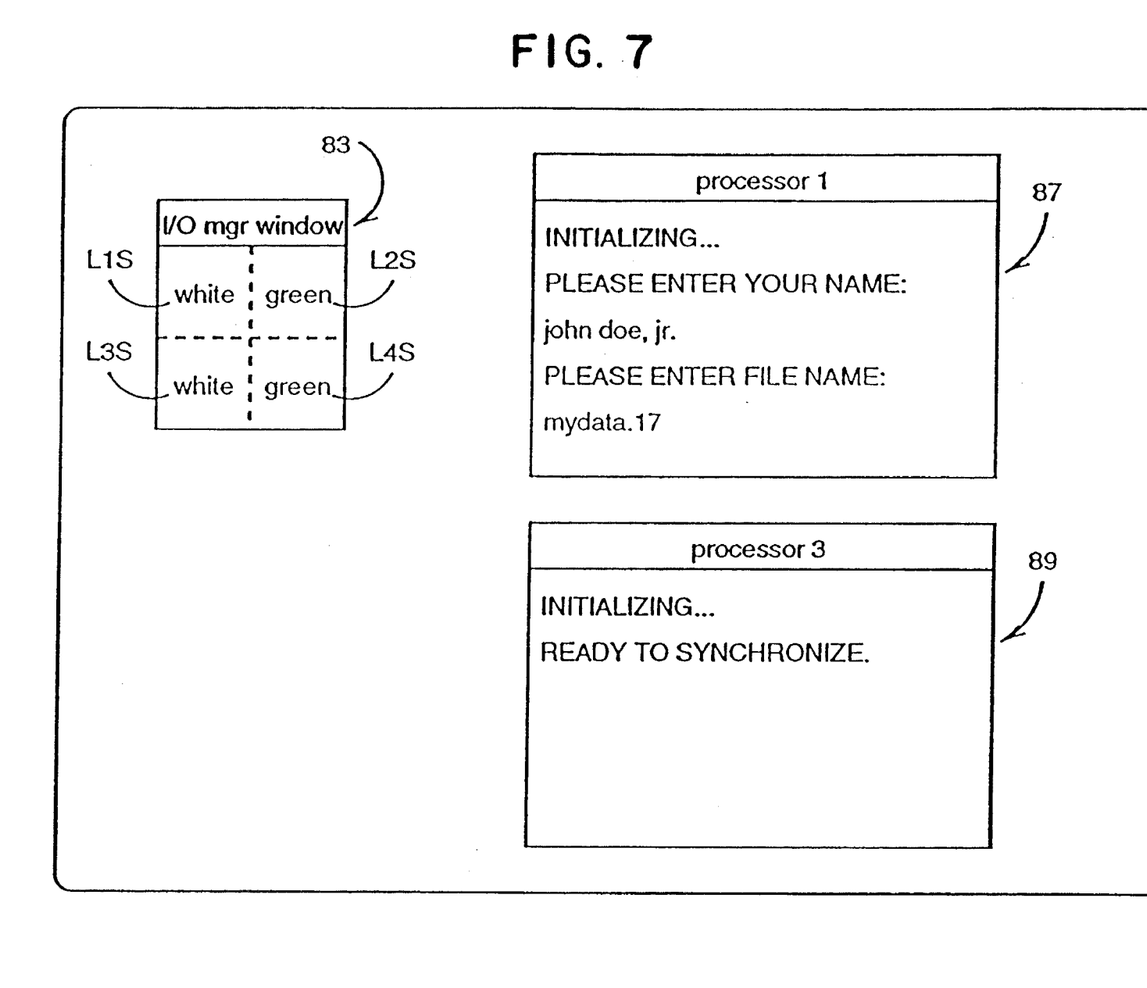
FIG. 7 is an illustrative view of the FIG. 4 user display screen at still another stage of use in which two I/O windows have been opened.

As the programs running on the other processors also perform output, the I/O status indicators representing them also turn green. This is shown in FIG. 7. To see this output, the user uses the mouse to point at one of the I/O status indicators, and presses the designated button. This causes the appropriate callback in the I/O manager to be invoked. The callback uses the X server to create another window, and displays the output in it. In FIG. 7, a new window 89 has been opened for I/O with the task running on processor number 3.

Although much of the foregoing detailed description describes I/O status indicators and calls the graphical element display manager an I/O manager, the particular invention claimed in this application involves another form of output to the user. Since the I/O status indicator feature is also part of the preferred embodiment of this invention, it is described in detail as well. The I/O status indicator feature is particularly claimed, however, in another application filed on the same day as this application by the same inventors and entitled "GRAPHICAL USER INTERFACE FOR MANAGING TEXT I/O BETWEEN A USER AND A PARALLEL PROGRAM". In accordance with this feature particularly claimed in this application, a parallel program task can request additional VLEDs to be displayed, and can then set them to various colors. For example, instead of writing out the text "INITIALIZING. . . ", the program could color a designated VLED (which is not used as an I/O status indicator VLED) in blue.

Figure 8:
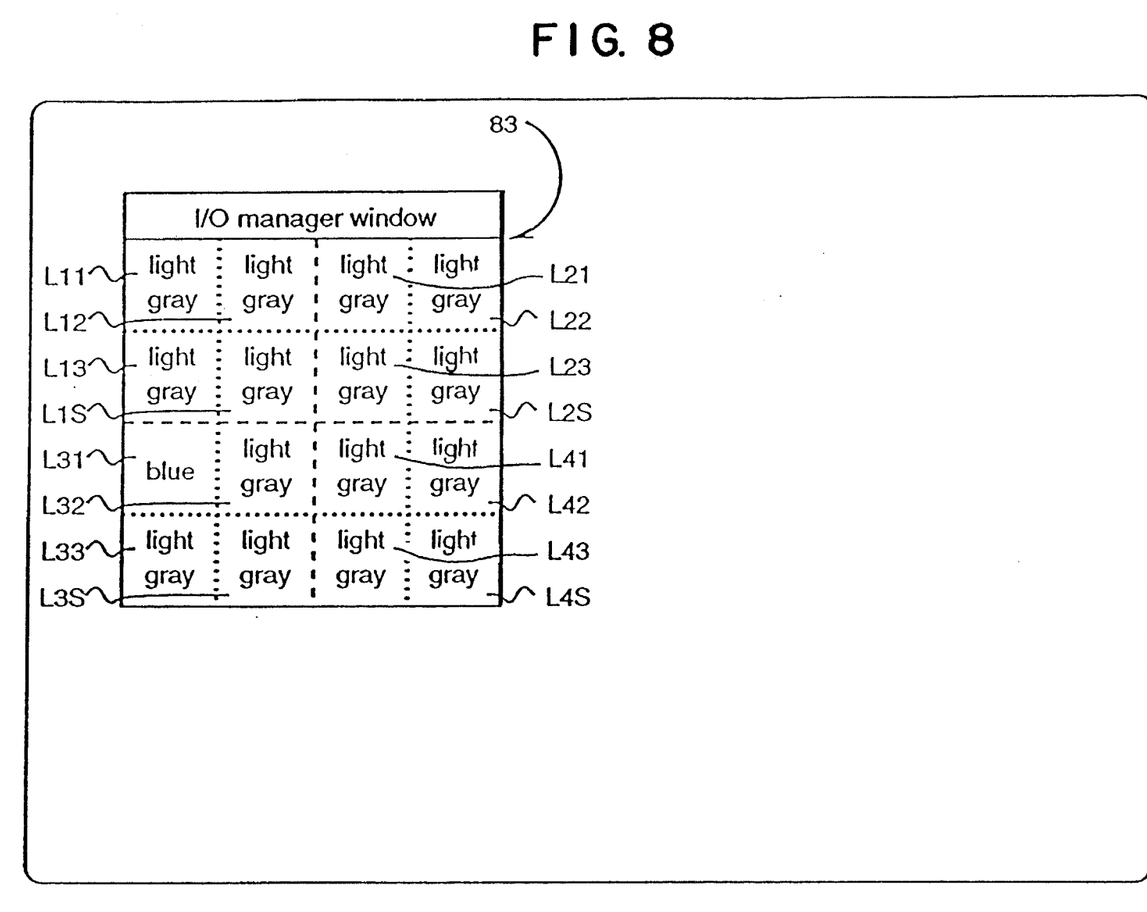
FIG. 8 is an illustrative view of a user display screen having a VLED display that contains both I/O status indicator VLEDs and other VLEDs.

To exercise this option, the application program must first request more VLEDs. This is done by calling the I/O library function that sets the number of VLEDs. This function sends a message to this effect to the I/O manager. The I/O manager then interacts with the X server to enlarge the VLED display window so as to accommodate the additional VLEDs. Any VLEDs that existed before the change retain their colors. For example, FIG. 8 shows the VLED display window 83 after the program has requested three more VLEDs. Each processor is now represented by a total of four VLEDs: three that can be used by the program, and a fourth that is used by the I/O manager to display the status of text I/O, as described above.

Once the required VLEDs have been created, the application can change their color by calling the "color VLED" function from the I/O runtime library. This function sends a message to the I/O manager, telling it which VLED to color and in what color. For example, assume the task running on processor number 3 asked that VLED number 1 be colored blue. The effect is shown in FIG. 8, where the I/O manager has used the X server to change the color of L31, which is the first VLED of those representing processor number 3.

DETAILED DESCRIPTION OF A PREFERRED IMPLEMENTATION

A preferred embodiment of the invention is shown in FIG. 3. The hardware platform includes three main components: a workstation 3 where the user logs on and issues commands, a multiprocessor 1 that is used to execute parallel programs, and an X terminal 7 supporting the X window system, through which the user interacts with the workstation. The software implementing the invention has two main components: a runtime library 47 that is linked with the application program 45 on the multiprocessor, and an independent load module that implements the I/O manager functions 43 on the user's workstation. The two parts communicate using whatever means are available, preferably so,me message passing kernel. A message passing kernel 13 is shown on the multiprocessor elements and on the workstation. The I/O manager module controls the display on the user's X terminal by calling the X library 49, which sends commands to the X server 77 running on the X terminal. User input travels along the opposite route: it is caught by the X server which sends it to the X library in the form of events. When the I/O manager asks the X library for the next event, it gets the input.

I/O Runtime Library

The runtime library 47 is simple and straightforward. It provides the application 45 with a set of function calls to perform tasks related to terminal I/O, as listed below. When a function is called, the runtime library uses the message passing kernel 13 to send a message with the relevant data to the I/O manager component 43.

The following description of the available functions delineates the messages that are sent to the I/O manager module, and gives a sketchy description of what the I/O manager module does when it receives these messages. A more detailed description of the I/O manager module is given in the next section.

- Output a string of text. The text is sent to the I/O manager component. If the outputting processor has an open window, the text is displayed immediately. If not, it is stored and the user is notified by turning the I/O status indicator VLED green.
- Input a string of text. A message with the requested length is sent to the I/O manager component. If this processor has buffered input, the request is satisfied immediately. If not, it is stored and the user is notified by turning the I/O status indicator VLED red.
- Open a text window. A message with the request code is sent to the I/O manager component. If the requesting processor does not have an open window, one is opened.
- Close a text window. A message with the request code is sent to the I/O manager component. If the requesting processor has an open window, it is closed.
- Set the color of a VLED. The VLED number and the color are sent. The I/O manager component identifies the VLED by its number and the task (or processor) that the message came from, and sets it to the specified color.
- Reset a VLED. This sets the VLED to its default color, which is gray. It is handled just like setting any other color.
- Query the number of VLEDs. A message with the request code is sent to the I/O manager component. It responds with the number of VLEDs per processor in the display.
- Set the number of VLEDs. A message with the requested number is sent to the I/O manager component. It changes the display accordingly.

I/O Manager Component

Figure 9:
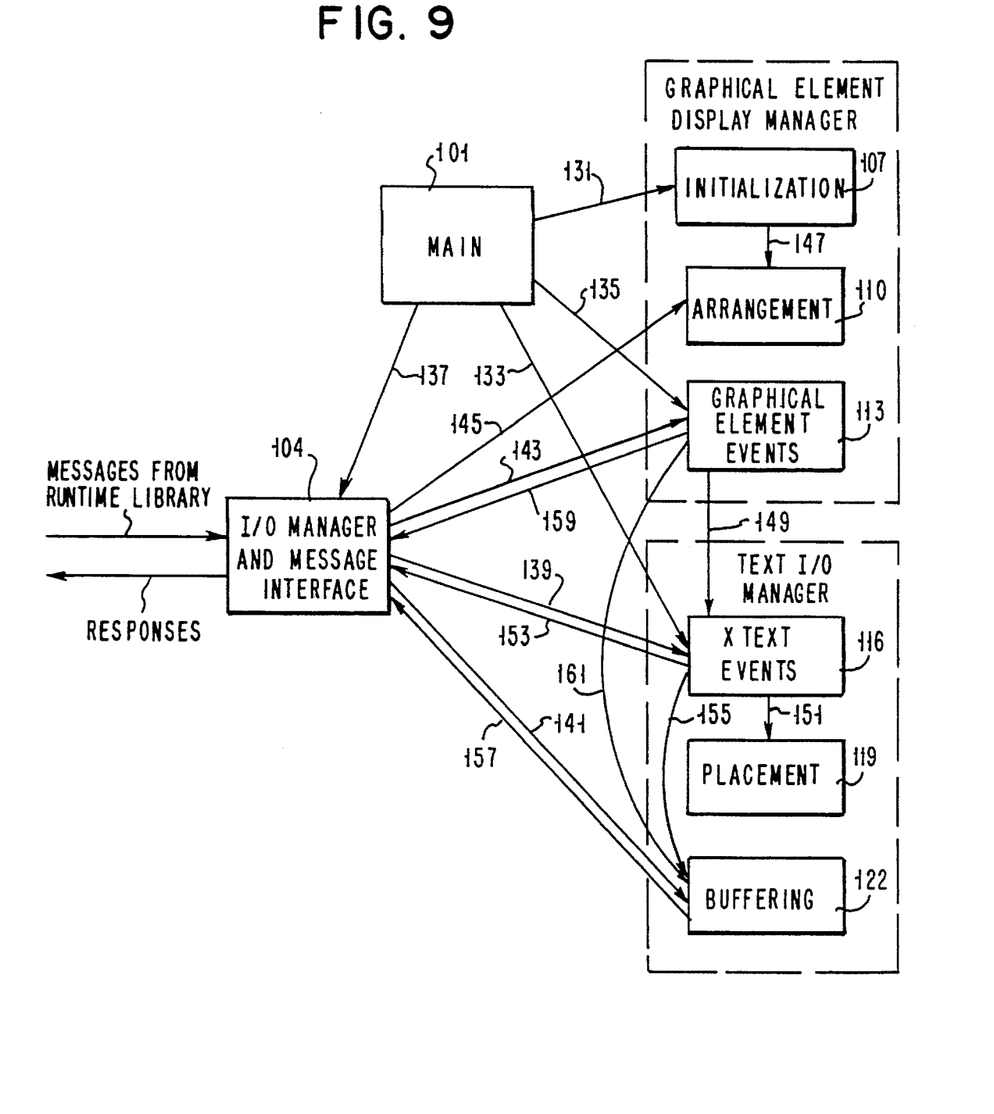
FIG. 9 is a detailed block and flow diagram of the structure of an I/O manager in accordance with this invention.

The I/O Manager component is composed of a number of modules, as shown in FIG. 9. The main module 101 contains the entry point of the whole I/O manager module. It causes the display to be created and then controls its functioning. The I/O manager's message interface module 104 receives the messages sent from the runtime library linked with the application via the message passing kernel, and forwards instructions to the other modules as appropriate. Three modules are involved in handling text I/O: the placement module 119 deals with the placement of windows on the screen; the X text events module 116 deals with the actual interaction with the X windows system in order to display and retrieve text; and the buffering module 122 handles the buffering required to implement input. Another three modules are used to implement the graphical element display (or VLED display): an initialization module 107 is used at initialization to create the VLED display; an arrangement module 110 is used to determine the arrangement of the portions of VLEDs representing each task and the arrangement of VLEDs in each of these portions; and a graphical clement events module 113 is used to handle VLED events generated by the application and X events generated by the user.

Main Module 101

The main module starts by activating the initialization module via path 131 in order to create the display. The initialization module is described in more detail below. Then the main module enters the main loop, and continues to loop until the user shuts down the display. This loop is required because the display module must react to asynchronous interactions from both the user and the application. In each iteration of the loop, checks are made to determine whether an X event has occurred or a message has arrived. If an X event has occurred, it is allowed to execute. This usually involves the invocation of a function from the modules that handle text events via path 133 or VLED events via path 135. The message interface module 104 is checked via path 137 for messages. If a message has arrived from the application, it is forwarded to the relevant module for handling via path 139 or path 141 or path 143 or path 145 depending upon circumstances.

I/O Manager & Message latterface Module 104

The message interface module is responsible for checking for the arrival of messages, and for receiving them when they do arrive. These two functions are implemented together by a nonblocking receive function. Nonblocking is needed so as to return control to the main loop in the case that no messages actually arrive, and thus enable the handling of additional X events.

Recall that messages reflect I/O function calls from the application to the runtime library. This module manages the activities resulting from such function calls. When a message is received it is handled as follows:

Text output—to the text handling module 116 via path 139. If the I/O status indicator VLED should be colored to notify the user of new output that is waiting to be seen, the VLED events module 113 is involved as well via path 143.

Text input—to the text buffering module 122 via path 141. If the I/O status indicator VLED should be colored to notify the user of a new request for input, the VLED events module 113 is involved as well via path 143.

Open or close a text window—the instruction itself is forwarded to the text handling module 116 via path 139, and the VLED events module 113 is instructed to change the color of the I/O status indicator VLED via path 143.

Set (or reset) the color of a VLED—to the VLED events module 113 via path 143.

Query the number of VLEDs—the reply is sent directly, without invoking any other module.

Change the number of VLEDs—use the arrangement module 110 to find an arrangement for the new number of VLEDs via path 145.

Display Initialization Module 107

This module is responsible for setting up the display. This includes opening the connection with the X server and creating the window used for the VLEDs. As part of this process, the arrangement module 110 is used via path 147 to determine the arrangement of the VLEDs for each task and the arrangement of tasks; new arrangements are created only if the number of VLEDs is changed. Then callback functions are attached to the window, to handle exposure, resizing, and user input events. The functions themselves are in the VLED events module 113 described in more detail below.

Arrangement Module 110

This module implements the policy of how the display is arranged. It is invoked at initialization, and thereafter only if the number of VLEDs is changed. When invoked, it produces three outputs:

The arrangement of the tasks (or processors): how many rows by how many columns. This is preferably as close to a square as possible.

The arrangement of the VLEDs belonging to each task (or processor): how many rows by how many columns. This too is preferably as close to a square as possible.

The size of each VLED. This cannot be so small that it can't be seen, but also not so big as to take up too much space on the screen.

VLED Events Module 113

This module contains two types of functions: those that implement application requests, and those that react to X events generated by the user. The functions that deal with user requests are simple, and just color the specified VLED in the specified color. The functions that respond to X events include the following:

Handle an exposure event by redrawing all the VLEDs.

Handle a resizing event by checking that the new size is legitimate, and correcting it if not.

Handle user commands by calling the appropriate function. Most of these are functions in the VLED events module itself, but some commands affect the text events module 116 via path 149, the message interface module 104 via path 159, and the buffering module 122 via path 161. The commands are described in more detail below in the "User Commands" section.

X Text Module 116

This module handles all the interactions with the X windows system regarding the text windows used for I/O by the different tasks (or processors). This includes two types of operations. The first is the actual creation and destruction of these windows. Windows are created in response to a user command via path 149 or a request from the application via path 139. When created for the first time, the placement module 119 also is used via path 151 to decide where on the screen to place the new window. If it is destroyed and recreated later, the same place is used.

The second type of operations are those that display text in the window for output, and retrieve text from the window for input. If output is done but the relevant window is not open, the text is stored for future display when the window is eventually opened. The handling of input typed by the user depends on whether or not input has been requested by the program. If an outstanding request is in effect, the input is sent to the requesting processor via path 153 to the message interface module 104. If the input was not requested, it is forwarded to the buffering module 122 via path 155 for matching with future input requests from the application.

Placement Module 119

This module mimics a tiled window manager. It keeps track of the location of the VLED display on the screen, and of the location of the various text windows. When a new window is opened, it is placed so as not to occlude the VLED) display or any of the previous windows if at all possible.

Input Buffering Module 122

This module does the actual interfacing between two asynchronous entities: the running program and the user. If the program requests input but the user hasn't typed any in yet, the request is buffered via path 141 until some input is typed in. If input is already buffered, it is used to satisfy the request via path 157. If the user types in text before it is requested, the text is buffered via path 155 until it is requested by the task.

User Commands

The user can control the display to a certain degree using the following commands, which translate to a callback function call in the VLEDs events module 113. The commands are given by typing a designated letter or pressing a mouse button when the focus is on the VLED display.

Open and close text windows. This is done by placing the mouse on any VLED associated with a certain task (or processor), and then giving the command. If the task (or processor) does not have an open window, one is opened for it. If it does, the window is closed. This requires the VLED events module to invoke the text events module via path 149 in FIG. 9.

Identify processor to which a VLED belongs. Again, the VLED is identified by placing the mouse on it.

Broadcast. Users can create a temporary window in which they can type input that will be sent to all the tasks (or processors). This is functionally equivalent to opening private windows to all the tasks (or processors), and typing the same text in each. The input is sent directly to the tasks via path 159 or is buffered via path 161, depending on whether or not it was requested by each one. In addition, it is echoed in the text windows via path 149.

Close. All open text windows are closed. This requires the VLED events module 113 to invoke the text events module 116 via path 149.

Change display mode. There are two display modes for the VLEDs: square, where both the processors and the VLEDs of each processor are arranged in a square-like rectangle, and rows, where the VLEDs of each processor are arranged in a row and the tasks (or processors) are arranged in a column, one above the other (if there is not enough space in the screen, more than one column may be used). The square mode is better for massively parallel systems, where each processor has a very small number of VLEDs (e.g. only one). It allows the user to immediately pick out those processors with abnormally colored VLEDs, which indicate a problem condition. The rows mode is better for smaller machines, especially if each processor has many different VLEDs, because the same VLEDs from all the processors are aligned one above the other.

This command is implemented by changing the arrangement of tasks (or processors) and VLEDs that was selected by the arrangement module 110.

Set VLED arrangement. In the square mode, the system has some freedom in choosing exactly how to arrange the tasks (or processors) and VLEDs (i.e. how many rows and columns to use). The user may override the system's choice, and dictate another arrangement.

VLED selection. In the square mode, the user may select to see only a certain VLED from each processor, rather than all VLEDs, to get a better picture of how this VLED reflects the status of the whole system.

Clear. All the text in all the windows is erased, and so is all the text that is stored for processors that do not currently have open windows. This requires the VLED events module to invoke the text events module via path 149. All VLEDs are changed to their original "off" color which is gray in this example).

Obtain help. The help window displays a summary of these commands.

Scalability

With very large numbers tasks (or processors or threads), it would be impossible to represent each one by an independent VLED. Luckily, users would not be able to assimilate the information in so many independent VLEDs anyway. Actually, users only need to see those that are different from the general behavior. Therefore it is possible to scale to ever larger numbers by using a condensed representative panel or array of VLEDs, where each VLED represents a set of tasks (or processors or threads), and its color is determined by the minority value rather than by the majority consensus. Thus all extra-ordinary processors will show up. The user would then be able to zoom in on those processors to investigate their status in greater detail.

Another aspect of sealability is the constant total I/O rate that can be handled by the I/O manager module. This means that the I/O rate per task (or processor) is inversely proportional to the system size. Note, however, that the rate at which a human user can handle I/O is even more limited. Therefore the problem can be solved by using a lazy output mechanism: output can be buffered at the tasks (or processors), rather than being sent for display immediately when produced. It is then actually sent only if the user requests it by opening a window to that task (or processor).

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A program output interface to a user from a parallel computer program executing on a parallel processing system, comprising:

a display terminal for displaying output on a screen to a user from a parallel program executing on a parallel processing system, said parallel program comprising a plurality of individual tasks executing in parallel with each other, each of said plurality of individual tasks comprising instructions and some of said instructions being graphical element instructions, each particular graphical element instruction specifying a particular graphical element state and a particular graphical element number relative to a particular task in which said particular graphical element instruction appears;

a runtime library function in said parallel processing system responsive to execution of any said graphical element instruction for passing a graphical element message to said display terminal, each said graphical element message identifying a particular task in which said graphical element instruction was executed and a particular graphical element number and particular graphical element state specified in said graphical element instruction; and a graphical element display manager for displaying an array of graphical elements on said screen, said graphical element display manager associating each one of said plurality of individual tasks with a unique portion of said graphical elements, said graphical element display manager receiving each said graphical element message and causing a particular graphical element corresponding to a particular task and a particular graphical element number specified by said graphical element message to be displayed at said display terminal in said particular graphical state specified in said graphical element message.

2. A program output interface as defined in claim 1 wherein each of said graphical elements is a geometrical shaped spot at a particularly defined position relative to other ones of said graphical elements.

3. A program output interface as defined in claim 2 wherein said geometrical shape is a square.

4. A program output interface as defined in claim 1 wherein each particular graphical state for any said graphical element is a particular color for said any graphical element.

5. A program output interface as defined in claim 1 wherein said graphical element display manager associates a same number of graphical elements with each of said plurality of individual tasks.

6. A program output interface as defined in claim 1 wherein said array of graphical elements is arranged in a rectangular array with all of said graphical elements associated with a particular task being displayed contiguously with each other.

7. A program output interface as defined in claim 1 wherein said array of graphical elements associated with each task is arranged in a line.

8. A program output interface as defined in claim 1 wherein said graphical elements each look like a colored light emitting diode (LED) to said user.

9. A program output interface as defined in claim 1 wherein each of said plurality of individual tasks is executing on a separate processing element of said parallel processing system and each said processing element executing one of said plurality of individual tasks contains a copy of said runtime library function.

10. A program output interface as defined in claim 1 wherein said display terminal is a workstation.

11. A program output interface as defined in claim 1 wherein said display terminal is connected to said parallel processing system via a workstation.

12. A program output interface as defined in claim 11 wherein said display terminal is connected to said workstation via a local area network (LAN).

13. A program output interface as defined in claim 1 wherein said array of graphical elements displayed by said graphical element display manager includes graphical elements having no graphical element number and which are not controlled by a graphical element instruction in a task.

14. A program output interface as defined in claim 1 wherein said array of graphical elements includes I/O status indicators, each one of said plurality of individual tasks corresponding uniquely to a different one of said I/O status indicators, each of said I/O status indicators having a first designated graphical state for indicating that the particular task corresponding to that particular I/O status indicator has text output that has not been displayed yet on said screen and a second designated graphical state for indicating that said particular task corresponding to that particular I/O status indicator is requesting text input from said display terminal.

15. A program output interface as defined in claim 1 wherein said array of graphical elements comprises only one graphical element responsive to said graphical element instructions for each one of said plurality of individual tasks.

16. A program output interface as defined in claim 1 wherein said array of graphical elements comprises four graphical elements for each one of said plurality of individual tasks.

17. A program output interface as defined in claim 16 wherein said four graphical elements for each one of said plurality of individual tasks include three graphical elements controllable by said graphical element instructions and one I/O status indicator.

18. A program output interface as claimed in claim 1 wherein said graphical clement display manager is controllable by said user at said display terminal to reset all of said graphical elements to a predetermined graphical state.

19. A program output interface as defined in claim 1 wherein one of said plurality of individual tasks includes a first special instruction which upon execution results in a request being made to said graphical element display manager to identify to said one task the particular number of said graphical elements being displayed at said display terminal that are controlled by said graphical element instructions of said one task.

20. A program output interface as defined in claim 19 wherein said one task includes a second special instruction which upon execution results in a request being made to said graphical element display manager to change the particular number of said graphical elements being displayed at said display terminal that are controlled by said graphical element instructions of said one task to a new value specified in said second special instruction.

21. A program output interface as defined in claim 1 wherein said graphical element display manager is controllable by said user to display only the particular graphical elements corresponding to a subset of said graphical element numbers.

22. A program output interface as defined in claim 1 wherein an alternative array of graphical elements is displayable by said graphical element display manager, each of said graphical elements in said alternative array corresponding with a set of tasks, each of said graphical elements in said alternative array having a particular graphical state when one or more of the particular tasks corresponding thereto has said particular graphical state.

23. A program output interface as defined in claim 1 wherein said parallel processing system is a massively parallel computer system.

\* \* \* \* \*